United States Patent [19]

Hisada et al.

[11] Patent Number: 5,123,100
[45] Date of Patent: Jun. 16, 1992

[54] TIMING CONTROL METHOD IN A COMMON BUS SYSTEM HAVING DELAY AND PHASE CORRECTING CIRCUITS FOR TRANSFERRING DATA IN SYNCHRONIZATION AND TIME DIVISION SLOT AMONG A PLURALITY OF TRANSFERRING UNITS

[75] Inventors: Isao Hisada; Takashi Kondo, both of Tokyo, Japan

[73] Assignee: NEC Corporation, Tokyo, Japan

[21] Appl. No.: 462,816

[22] Filed: Jan. 10, 1990

[30] Foreign Application Priority Data

Jan. 13, 1989 [JP] Japan .................................. 1-6187

[51] Int. Cl.⁵ ...................... G06F 13/36; G06F 13/42
[52] U.S. Cl. ...................................... 395/550; 364/DIG. 1;
364/DIG. 2; 364/238.3; 364/240.1; 364/242;
364/271; 364/271.5; 364/940.2; 364/950.3;
364/950.4; 340/825.2; 340/825.14; 370/85.1
[58] Field of Search ... 364/200 MS File, 900 MS File;
370/85.1; 340/825.2, 825.14

[56] References Cited

U.S. PATENT DOCUMENTS

| 4,229,792 | 10/1980 | Jensen et al. | 364/200 |
|---|---|---|---|
| 4,271,465 | 6/1981 | Ohtsuka et al. | 364/200 |
| 4,322,794 | 3/1982 | Kurakake | 364/200 |
| 4,373,183 | 2/1983 | Means et al. | 364/200 |
| 4,470,110 | 9/1984 | Chiarottino et al. | 364/200 |
| 4,562,533 | 12/1985 | Hodel et al. | 364/200 |
| 4,646,291 | 2/1987 | Perntz et al. | 370/85 |
| 4,660,169 | 4/1987 | Norgren et al. | 364/900 |
| 4,661,905 | 4/1987 | Bomba et al. | 364/200 |
| 4,663,708 | 5/1987 | Taub | 364/200 |
| 4,669,056 | 5/1987 | Waldecker et al. | 364/900 |
| 4,733,390 | 3/1988 | Shirakawa et al. | 370/85 |

Primary Examiner—Thomas C. Lee
Assistant Examiner—Krisna Lim
Attorney, Agent, or Firm—Laff, Whitesel, Conte & Saret

[57] ABSTRACT

In a common bus control method, transmission and reception buses are connected to a unit having a unit number 1. A synchronization frame head signal for time-division slots of common buses is sequentially supplied to the units in the order of the unit numbers 1 to n through delay circuits. Phase correcting circuits are respectively connected to the transmission and reception buses of each unit so as to perform phase correction of data on the buses and latch signals for latching the data. The delay circuit arranged in each unit sets transmission delay data having an inherent delay difference on the basis of the synchronization frame head signal. An output from the delay circuit of each unit is used as the latch signal.

3 Claims, 7 Drawing Sheets

TIMING CONTROL METHOD IN A COMMON BUS SYSTEM HAVING DELAY AND PHASE CORRECTING CIRCUITS FOR TRANSFERRING DATA IN SYNCHRONIZATION AND TIME DIVISION SLOT AMONG A PLURALITY OF TRANSFERRING UNITS

BACKGROUND OF THE INVENTION

The present invention relates to a common bus control method in an electronic switching system.

Figure 6:
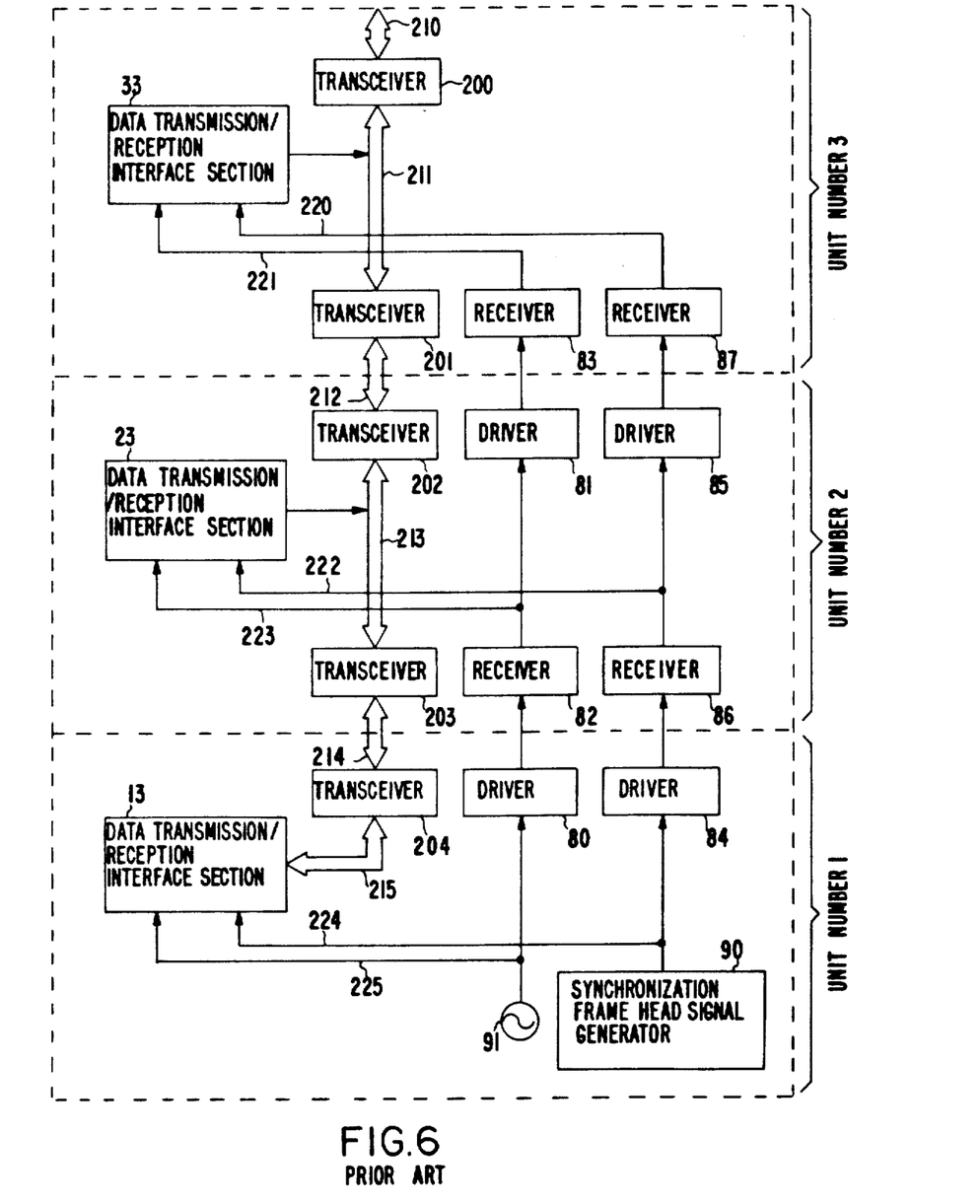
FIGS. 6 and 7 are a block diagram and a timing chart, respectively, for explaining a conventional system arrangement.

A conventional electronic switching system includes a plurality of units of, e.g., unit numbers 1, 2, and 3 shown in FIG. 6. The plurality of units are connected to common buses 210, 211, 212, 213, 214, and 215 through transceivers 200, 201, 202, 203, and 204. Data transmission/reception interface sections 13, 23, and 33 of the respective units establish frame synchronization of time-divisional slots of the common buses by using a frame head signal generated by a synchronization frame head signal generator 90 of the first unit. In addition, the interface sections 13, 23, and 33 latch and transmit data of the common buses in response to signals transmitted from a system fundamental clock source 91 of the first unit. Referring to FIG. 6, reference numerals 80, 81, 84, and 85 denote drivers; and 82, 83, 86, and 87, receivers.

Figure 7:
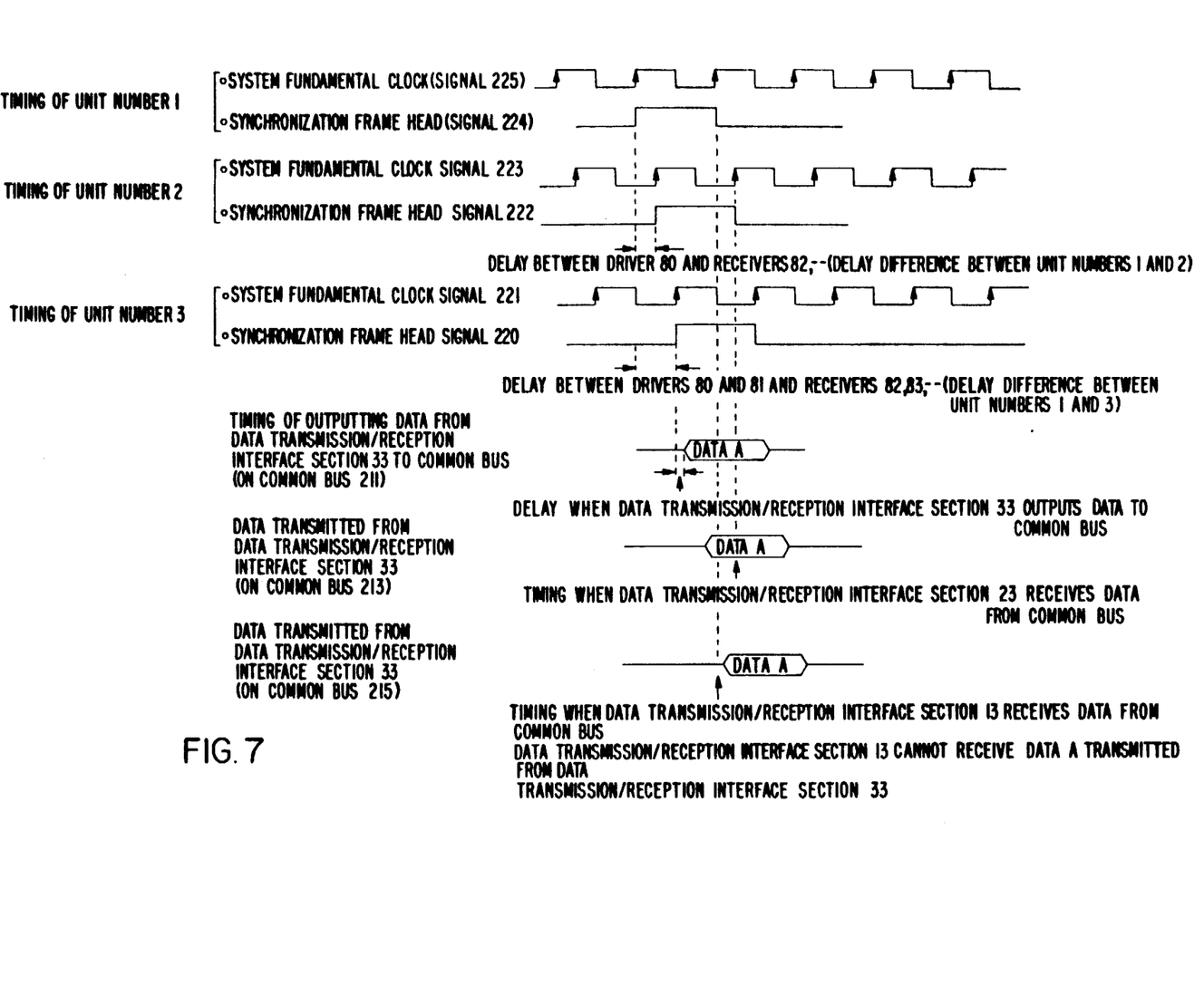

In the above-described electronic switching system, the respective units perform data transmission/reception through the common buses in accordance with two signals output from the synchronization frame head signal generator 90 and the system fundamental clock source 91 of the unit having the unit number 1. For this reason, as shown in FIG. 7, an absolute difference in timing between the two signals is made due to delay between the drivers 80 and 81, and the receivers 82 and 83, and cable delay between the units. Since the respective units have different absolute timings of data transmission/reception with respect to the common buses, data A transmitted from the data transmission/reception interface section 33 onto the common bus 211 may not be properly received by the interface section 13 of the unit number 1, although the data A can be properly received by the interface section 23 of the unit number 2.

That is, in the conventional method, since data of the common buses are transmitted/received in accordance with a fundamental clock and a synchronization frame head signal transmitted from the fundamental unit, the number of units is increased, and data transmission/reception is adversely affected by delay of each unit. As the unit number is increased (delay from the fundamental unit is increased), the margin between data and its latch signal is reduced. As a result, the number of units is undesirably limited.

SUMMARY OF THE INVENTION

It is a principal object of the present invention to provide a common bus control method which allows data transmission between units regardless of the number of units.

It is another object of the present invention to provide a common bus control method which allows longer distances between units than a conventional control method.

It is still another object of the present invention to provide a common bus control method which allows a higher data transmission speed on common buses.

It is still another object of the present invention to provide a common bus control method which can prevent a setting error in timing formation.

In order to achieve the above objects, according to the present invention, there is provided a common bus control method in an electronic switching system including n units having unit numbers 1 to n, the units being connected to each other in the order of the unit numbers through common buses to be time-divisionally controlled, and the common buses consisting of transmission and reception buses, comprising the steps of connecting the transmission and reception buses to the unit having the unit number 1, sequentially supplying a synchronization frame head signal for time-divisional slots of the common buses to the units in the order of the unit numbers 1 to n through delay means, respectively connecting phase correcting means to the transmission and reception buses of each of the units so as to perform phase correction of data on the buses and latch signals for latching the data, causing the delay means arranged in each of the units to set transmission delay data having an inherent delay difference on the basis of the synchronization frame head signal, and using an output from the delay means of each of the units as the latch signal.

DETAILED DESCRIPTION OF THE PREFERRED EMBODIMENT

The present invention will be described below with reference to the accompanying drawings.

An embodiment of the present invention will be described below with reference to FIGS. 1, 2, 3, and 4. In this embodiment, three units having unit numbers 1, 2, and 3 will be exemplified. A clock and a frame head signal respectively generated by a system fundamental clock source 91 and a synchronization frame head signal generator 90 are transmitted to the respective units through drivers 80 and 81 and delay setting circuits (circuits for performing phase correction of one-clock components of the system fundamental clock) 1, 2, and 3. Each unit receives the clock and the frame head signal respectively transmitted from the system fundamental clock source 91 and the synchronization frame head signal generator 90, and is operated in accordance with these signals. Common buses 41 to 46 and 48 to 52 are constituted by transmission buses 41 to 46 and reception buses 48 to 52. Phase correcting circuits (circuits for performing phase correction of one-clock components of the system fundamental clock) 15, 25, 27, 35, and 37, and phase correcting circuits 14, 24, 26, 34, and 36 are respectively arranged on these transmission and reception buses. The common buses are time-divisionally controlled to have 1024 time-divisional slots by a received fundamental clock in accordance with a frame head signal received by each unit. The delay setting circuits 1, 2, and 3 respectively output pairs of signals 100 and 101, 102 and 103, and 104 and 105 having fixed delays (the pair of signals of the unit number 1 have no delay difference, and the delay difference between the signals is increased by one as the unit number is increased by one) to timing signal generators 12, 22, and 32 of the respective units. Upon reception of the pairs of signals, the timing signal generators 12, 22, and 32 respectively generate pairs of timing signals 60 and 61, 62 and 63, and 64 and 65 for transmitting/receiving data to/from the transmission and reception buses in the respective units, and supply them to the data transmission/reception interface sections 13, 23, and 33. In accordance with these timing signals, the interface sections 13, 23, and 33 respectively transmit data to the transmission buses 46, 44, and 42, and the interface sections 23 and 33 receive data from the reception buses 49 and 51.

Figure 4:
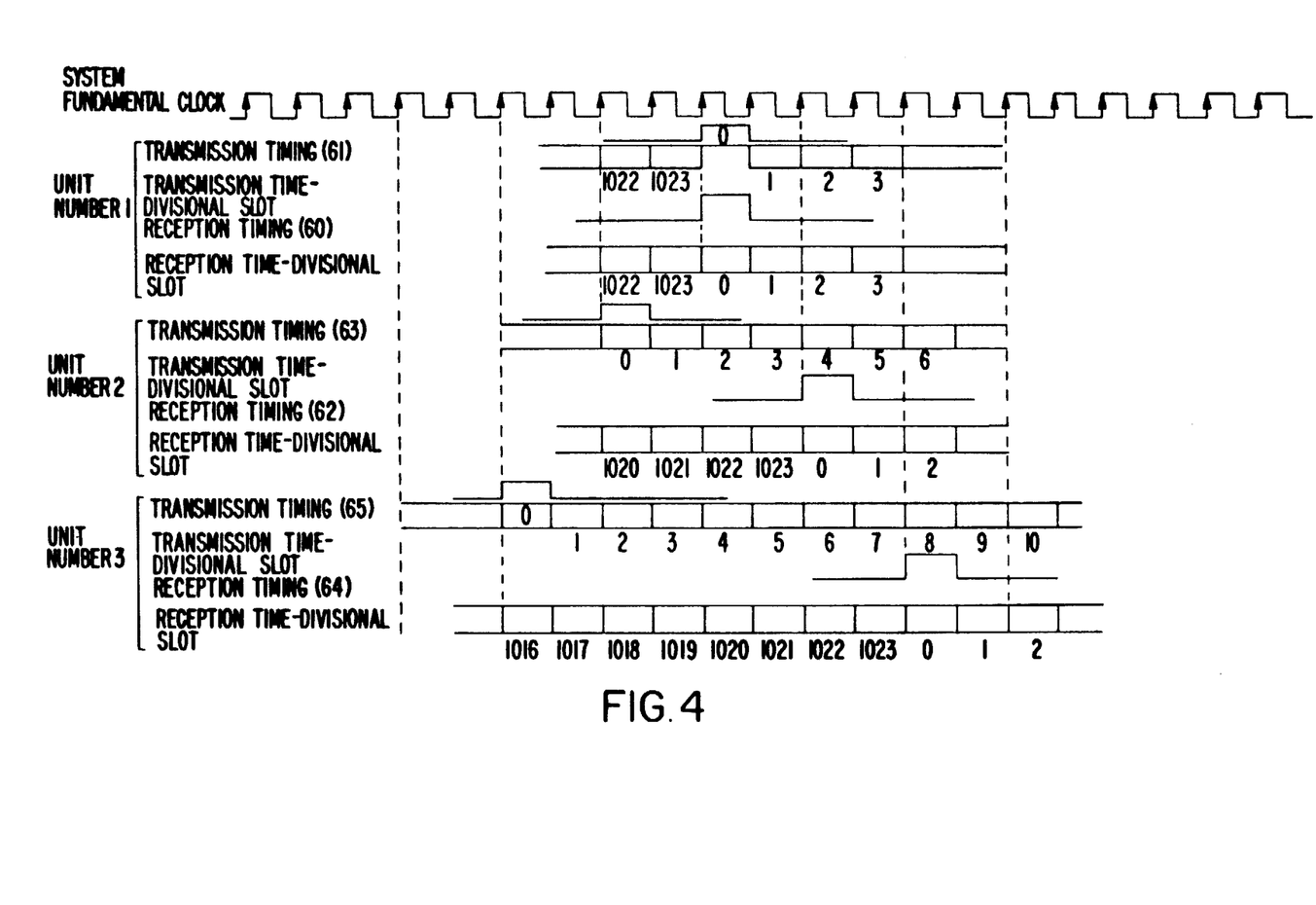
FIG. 4 is a timing chart showing a relationship between time-divisional slots and transmission/reception timing signals in each unit in the first embodiment.

Data reception from the reception buses 46 to 51 is performed in accordance with frame head signals 100, 102, and 104 generated by the synchronization frame head signal generator 90. Phase correction is performed to sequentially increase the phase shift amount of each frame head signal by one clock as the unit number is increased one by one, and hence the phases of the frame head signal differ from each other between the respective units. Since the reception buses are connected to the unit numbers 1 to 3 through the phase correcting circuits 14, 24, 26, 34, and 36, the data of the reception buses flow in the same direction as that of the frame head signals and phase-corrected by the same correction count as that of the frame head signals. Therefore, if the data on the reception buses are received at the timings of the frame head signals, the same data can be received regardless of the number of units (see a relationship between reception timings and time-divisional slots in FIG. 4). In the transmission side, however, since the data flow of the transmission buses is set in the opposite direction to that of the frame signals, data must be transmitted at a timing earlier than the reception timing of each unit by the predetermined number of data slots (see a relationship between transmission timings and reception timings in FIG. 4). The difference between a transmission timing and a reception timing corresponds to (the number of times when data passes through the phase correcting circuits 14, 15, 24 to 27, and 34 to 37 on the common buses) x (the number of system fundamental clocks). These transmission timings are respectively formed by the timing signal generators 12, 22, and 32 of the respective units. FIG. 4 shows a circuit operation when the common buses are controlled to have 1024 time-divisional slots.

Figure 2:
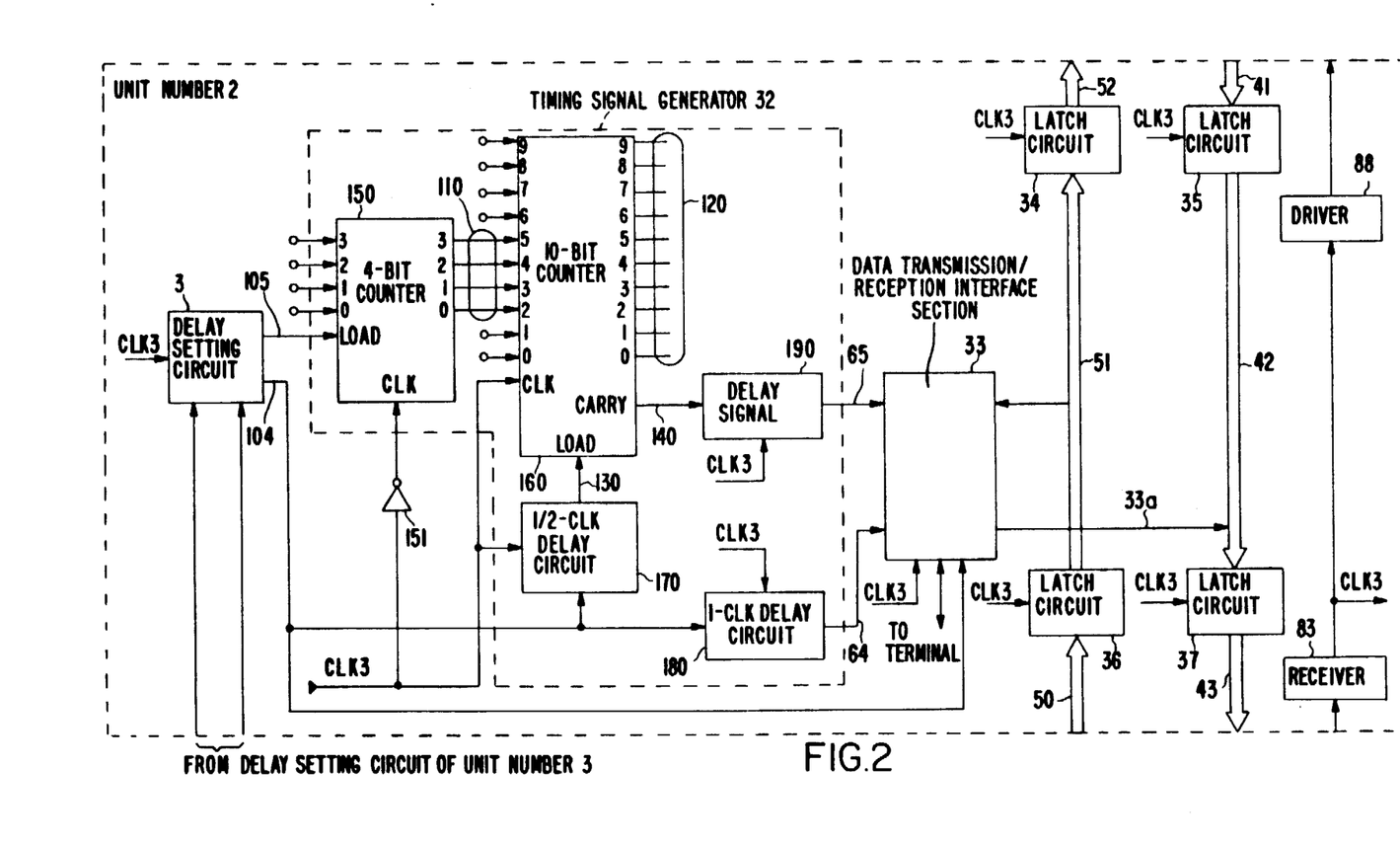
FIG. 2 is a block diagram showing a detailed arrangement of a unit in FIG. 1.
Figure 3:
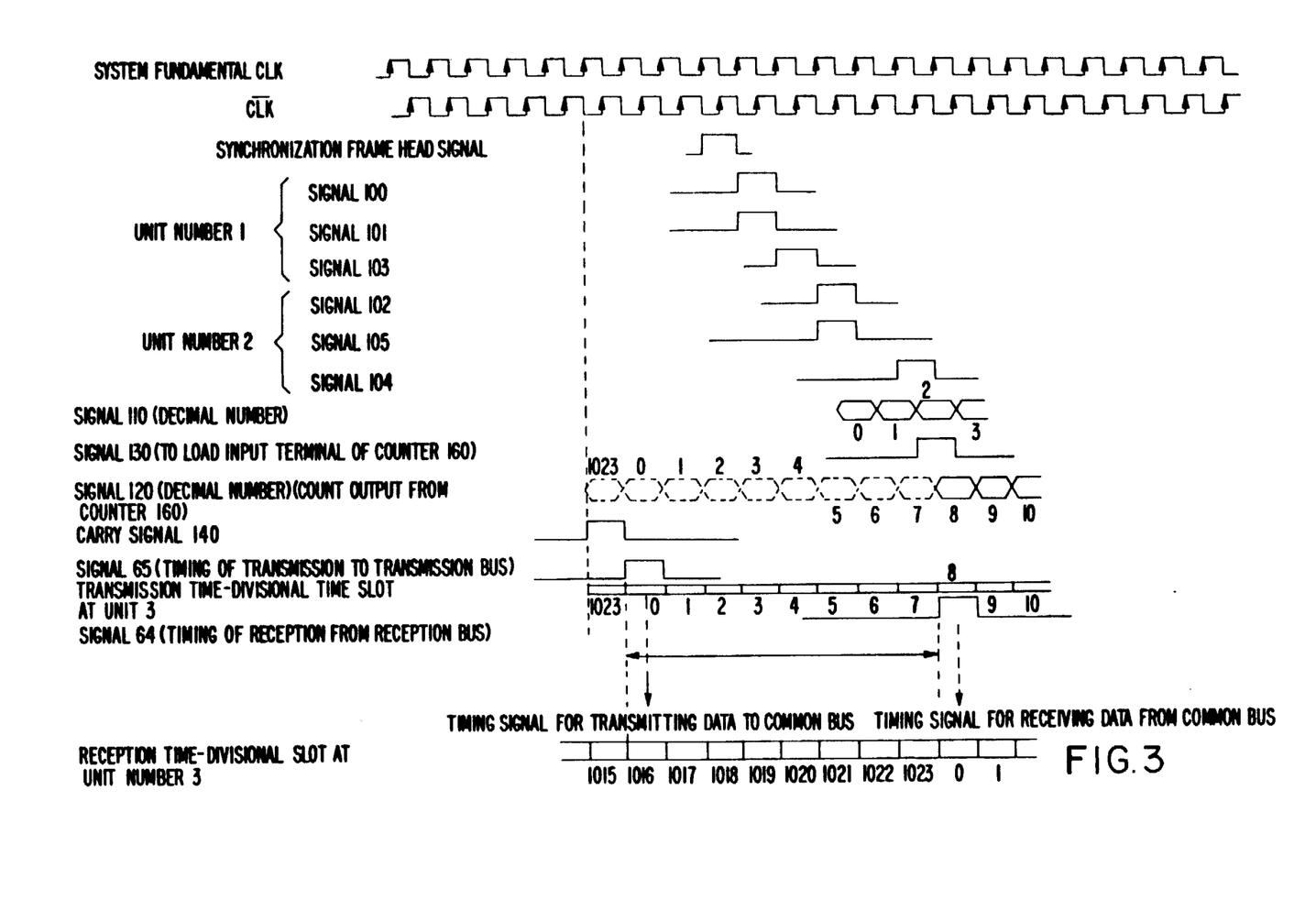
FIG. 3 a timing chart for explaining the generation of timing signals to be transmitted/received to/from common buses in the first embodiment.

The unit having the unit number 3 (FIG. 2) will be exemplified, and its operation will be described in detail below with reference to a timing chart in FIG. 3. A latch circuit 37 as a phase correcting circuit latches (phase correction corresponding to one clock) data transmitted from the data transmission/reception interface section 33 in response to a system fundamental clock CLK3 which is supplied from the unit of the unit number 2 and received by a receiver 83, and transmits it to the unit of the unit number 2. A latch circuit 36 as a phase correcting circuit latches data supplied from the unit of the unit number 2 through the reception bus 50 in response to the clock CLK3, and transmits it to the reception bus 51. The signal 105 output from the delay setting circuit 3 is input, as a load input, to a 4-bit counter 150 and is supplied to data input terminals 0, 1, 2, and 3 thereof, thus loading "0". The 4-bit counter 150 is incremented from the load input "0" by a signal which is obtained by inverting the system fundamental clock CLK3 using an inverter 151, and counter output bits 110 from the output terminals 0, 1, 2, and 3 are respectively input to four bits, i.e., third to sixth bits of the load data terminals of a 10-bit counter 160. The remaining bits, i.e., the first, second, seventh, and tenth bits receive "0"s, respectively. The signal 104 output from the delay setting circuit 3 is delayed by ½ the clock CLK3 using ½-clock delay circuit 170, and a delayed signal 130 is input to the load input terminal of the 10-bit counter 160. That is, the 4-bit counter 150 is incremented by an amount corresponding to the delay difference between the signals 104 and 105 output from the delay setting circuit 3, and hence the value (signal 110) to be loaded in the 10-bit counter 160 varies. This value is then loaded in the 10-bit counter 160 (in the unit number 3, load value 8→ signal 120). Although this delay difference varies depending on the unit number, the count sequence of the 4-bit counter and the 10-bit counter 160 is determined to obtain unique transmission and reception timings of each unit. A carry signal 140 from the 10-bit counter 160 is delayed by one clock of the system fundamental clock CLK3 by means of a one-clock delay circuit 190, and a delayed signal 65 is input to the data transmission/reception interface section 33. In this case, the timing signal generator 32 finally uses the carry signal from the counter 160 so as to obtain a transmission timing signal, but does not use the count output 120 from the counter 160 at all. At this time, the count of the counter 160 is $2^{10}=1024$. The delayed signal 65 is used as a timing signal for transmitting data to the transmission bus through a line 33a. In addition, the signal 104 output from the delay setting circuit 3 is delayed by one clock of the system fundamental clock CLK3 by means of a one-clock delay circuit 180, and a delayed signal 64 is input to the data transmission/reception interface section 33. This delayed signal 64 is used as a timing signal for receiving data from the reception bus. Note that in the unit of the unit number 3 whose detailed arrangement is shown in FIG. 2, the phase correcting circuits 34, 35, 36, and 37 of the same unit in FIG. 1 are constituted by latch circuits.

Figure 1:
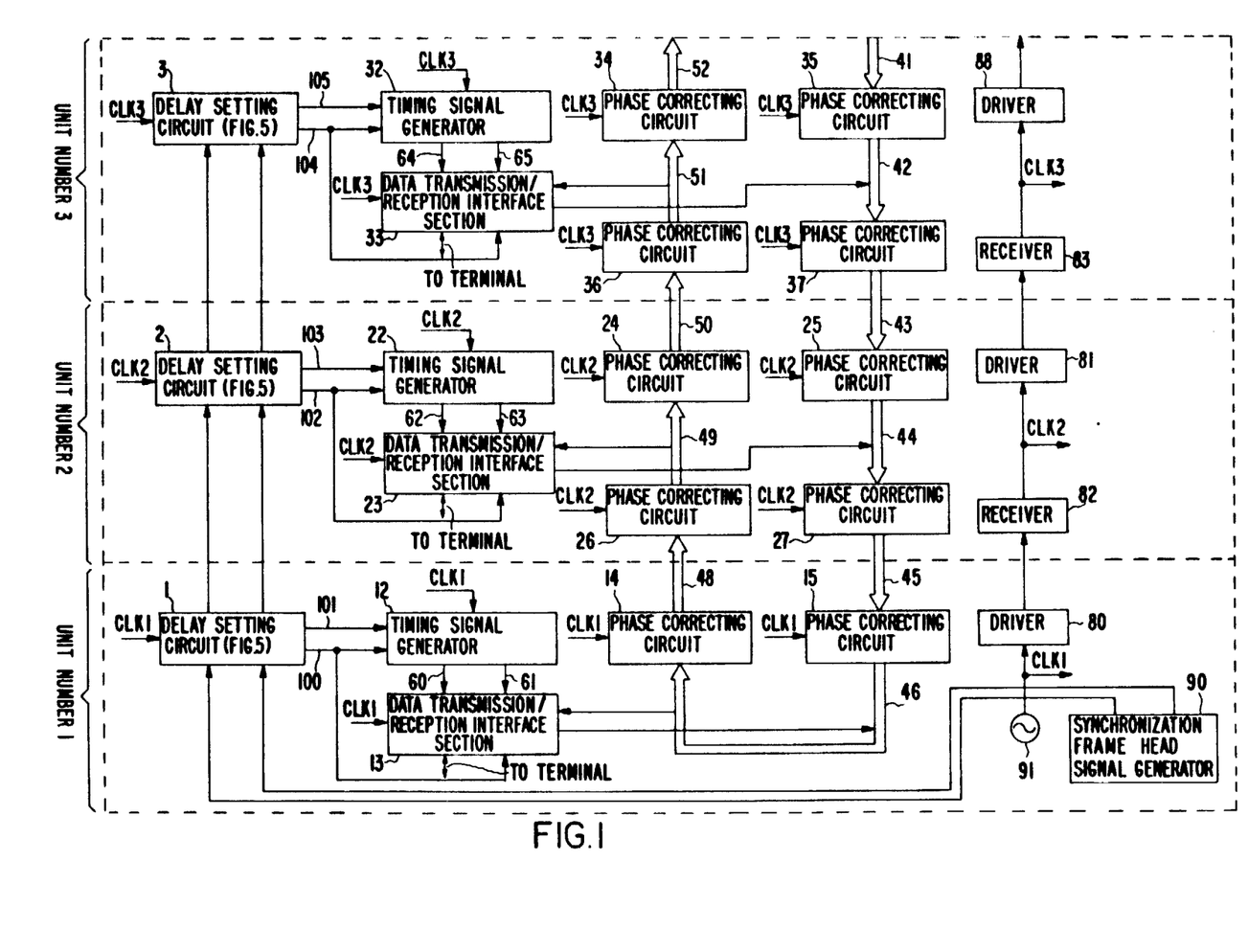
FIG. 1 is a block diagram showing an arrangement of the first embodiment of the present invention.
Figure 5:
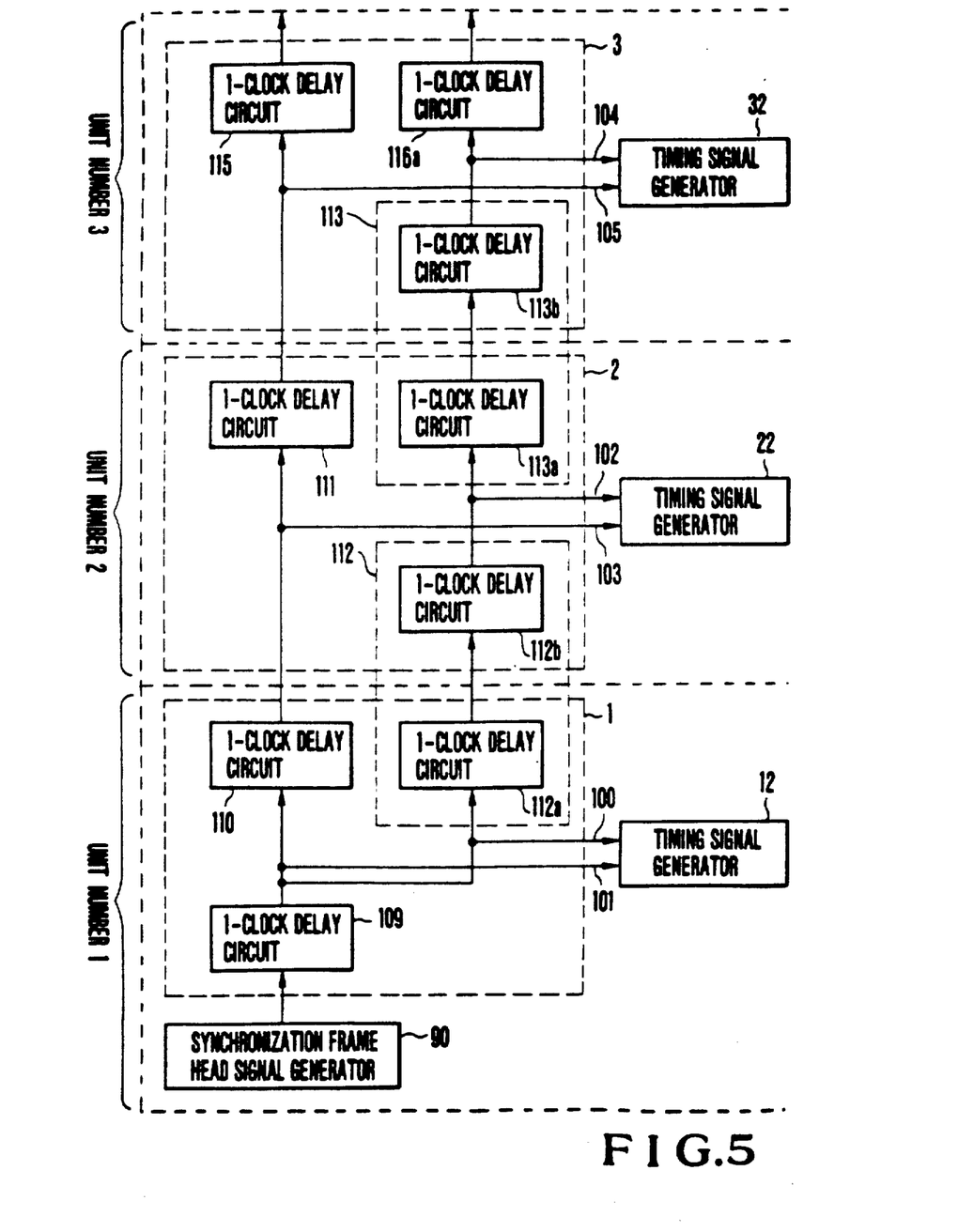
FIG. 5 is a block diagram showing a detailed arrangement of delay setting circuits in FIG. 1 and their peripheral circuits.

FIG. 5 shows a detailed arrangement of the delay setting circuits 1, 2, and 3 in FIG. 1 and their peripheral circuits. The delay setting circuit 1 used in the unit of the unit number 1 includes a one-clock (1-CLK) delay circuit 109 for receiving a synchronization frame head signal (see FIG. 3) output from the synchronization frame head signal generator 90, and one-clock delay circuits 110 and 112a. The frame head signals delayed by one clock through the one-clock delay circuit 109 are supplied, as signals 100 and 101, to the timing signal generator 12. At this time, as shown in FIG. 4, each frame head signal is a pulse having a width corresponding to one period of the clock. In addition, as shown in FIG. 3, the signals 100 and 101 have the same pulse waveform. That is, these signals have a delay difference of "0". The signal 100 is also supplied to the data transmission/reception interface section 13. The delay setting circuit 2 used in the unit of the unit number 2 includes a one-clock delay circuit 111 for receiving an output from the one-clock (1-CLK) delay circuit 110 constituting the delay setting circuit 1, a one-clock delay circuit 112b for receiving an output from the one-clock (1-CLK) delay circuit 112a constituting the delay setting circuit 1, and a one-clock delay circuit 113a.

Outputs from the one-clock delay circuits 110 and 112b are supplied, as signals 103 and 102, to the timing signal generator 22 of the unit of the unit number 2. In this case, the signal 103 is delayed by one clock with respect to the signals 100 and 101, and the signal 102 is delayed by two clocks through a two-clock (2-CLK) delay circuit 112 constituted by the one-clock delay circuits 112a and 112b. Therefore, the signal 102 is delayed by one clock with respect to the signal 103. FIG. 3 clearly shows this. The signal 102 is also supplied to the data transmission/reception interface section 23.

The delay setting circuit 3 used in the unit of the unit number 3 has the same arrangement as that of the delay setting circuit 2 described above. That is, the delay setting circuit 3 includes a one-clock delay circuit 115 for receiving an output from the one-clock delay circuit 111 constituting the delay setting circuit 2, a one-clock delay circuit 113b for receiving an output from the one-clock delay setting circuit 113a constituting the delay circuit 2, and a one-clock delay circuit 116a for receiving an output from the delay circuit 113b. An output from the delay circuit 111 (input to the delay circuit 115) and an output from the delay circuit 113b are supplied, as signals 105 and 104, to the timing signal generator 32. The signal 104 is delayed by one clock with respect to the signal 105. That is, these signals have a delay difference of "2".

The one-clock delay circuits 113a and 113b constitute a two-clock delay circuit 113. The signal 104 is also supplied to the data transmission/reception interface section 33.

Delay circuits used in units of larger unit numbers will have the same arrangement as that of the delay circuit of each of the units of the unit numbers 2 and 3.

In the respective units, the above-described pairs of signals (each pair of signals have a fixed delay difference in a corresponding unit) are respectively input to the timing signal generators 12, 22, and 32 shown in FIG. 1 so that two signals for establishing timings of receiving and transmitting data can be automatically set in each unit. In this embodiment, the fixed delay difference between two signals generated by each unit is set to be one clock. However, the fixed delay difference is not limited to one clock.

Note that the respective units have the same arrangement except for the delay setting circuits, as is apparent from the description. However, the delay circuit 109 in FIG. 5 may be omitted.

As has been described above, according to the present invention, data transmission between the units can be properly performed, even if the number of units is increased, by only considering a delay difference corresponding to one unit. Since the number of units is not limited, and the margin between data of the common buses and its latch signal is increased, the distances between the units can be increased, and the data transmission speed on the common buses can also be increased. In addition, signal lines are arranged such that signals are allowed to sequentially pass through the first unit to the nth unit and that each signal is output to the next unit with a fixed delay set in each unit. By using the delay differences between the signal lines, timings of transmitting and receiving data to and from the common buses can be automatically formed, thus preventing a setting error in this timing formation.

What is claimed is:

1. A timing control method in a common bus system in which n units having unit numbers 1 to n are connected through a common-time-division bus, said units being connected in series and in the order of the unit numbers, said common-time-division controlled bus comprising transmission and reception buses providing access to each of said units, said transmission and reception buses being connected together at said unit number 1, and a plurality of phase correcting means corresponding to said units, each of said phase correcting means performing a phase correction of data based on base clock signals generated in the unit number 1 when data are transmitted/received from one of said units to an adjacent unit, said method comprising the steps of:

setting a transmission delay information with a specific delay difference which is determined in accordance with the unit number of each of said units, said transmission delay being based on a synchronization frame head signal generated in the unit number 1; and preparing a timing signal which determines a transmission time slot for the data transmission on the common-time-division controlled bus based on the received transmission delay information, said transmission time slot having a timing difference relative to the adjacent unit and being set between reception time slots;

said unit number 1 transmitting said first and second fundamental signals which are based on the synchronization frame head signal to said unit with the unit number 2;

each of said units having the units number 2 to n sequentially receiving first and second fundamental signals having a fixed delay difference which are prepared in the last unit to transmit delayed first and second fundamental signals being made respectively by adding additional fixed delay differences to the received first and second fundamental signals.

2. A timing control method in a common bus system according to claim 1, further comprising means in each of the units for preparing said timing signal, and means in each of said units number 2 to n controlled by said base clock signals for transmitting data to the next unit.

3. A timing control method in a common bus system according to claim 1 wherein each of said units having unit numbers 2 to n has means for detecting a transmission delay information which is to be set in the unit itself in accordance with said received transmission delay information.

* * * * *